Oct. 27, 1931.  C. OTTO  1,829,608
VERTICAL CHAMBER COKE OVEN
Filed Oct. 14, 1926

Carl Otto INVENTOR
BY W. F. Bissing
ATTORNEY

Patented Oct. 27, 1931

1,829,608

UNITED STATES PATENT OFFICE

CARL OTTO, OF ESSEN-RUHR, GERMANY

VERTICAL CHAMBER COKE OVEN

Application filed October 14, 1926, Serial No. 141,599, and in Germany October 14, 1925.

The invention relates to coke ovens having vertical chambers in front of the narrow sides of which are arranged regenerators.

It is well known with ovens of this type to preheat gas and air in the regenerators of one side of the chamber and to supply them to the appurtenant heating walls for combustion, and to further conduct the products of this combustion to the appurtenant regenerators which are arranged on the other side of the chamber. This arrangement, however, requires four regenerator chambers with the respective four reversing devices to be provided for each heating wall.

In my copending patent application Serial No. 73,610 I have already proposed in what manner at least half the number of said regenerator chambers and reversing devices may be dispensed with, this being obtained by causing gas and air coming from the regenerator chambers of one side to enter the heating flues of the appurtenant walls for combustion, and to cause the products of combustion to pass through distribution channels onto one or more walls from which they enter the regenerator chambers allotted to these walls and located at the same front side of the chamber.

Now my present invention has for its object to offer another realization of the idea of the above-mentioned invention.

According to my invention the heating walls are divided by a partition transverse thereto into halves each containing a plurality of flues and each two adjacent heating walls are connected in pairs to a gas regenerator and an air generator, so that two regenerator chambers only, with the necessary reversing devices are required for each heating wall. Furthermore, dampers or the like are arranged in the connecting channels leading to the appurtenant wall halves in front of the regenerators, in order to throw each individual heating wall out of operation when desired and to regulate the quantities of gas and air supplied to it.

In order to allow of my invention to be more easily understood, an embodiment of the subject-matter of same is illustrated in the drawings which accompany and form part of this specification.

Figure 1:
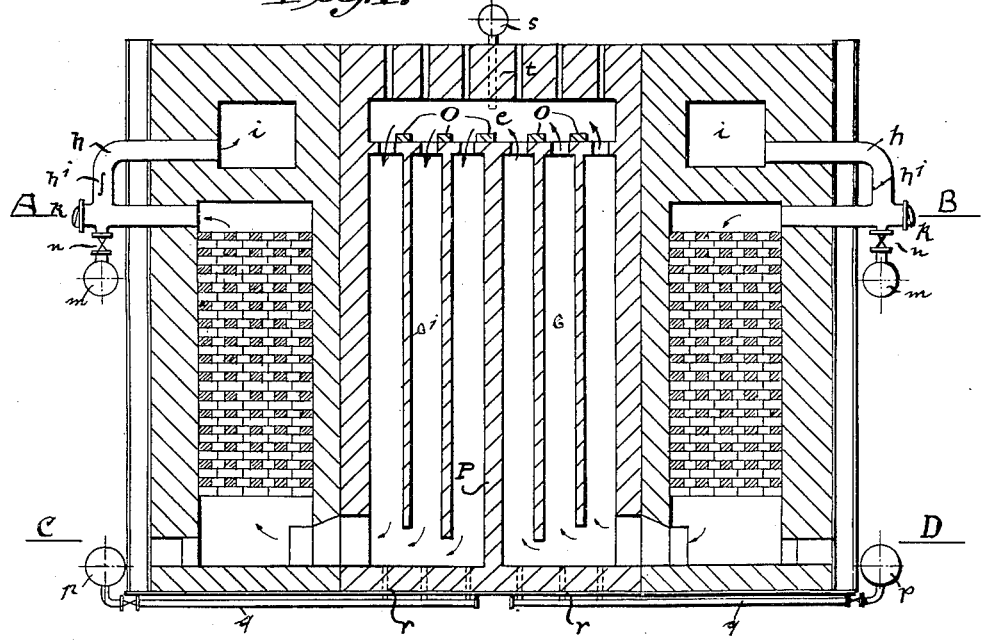
Fig. 1 is a longitudinal section of the first embodiment.
Figure 2:
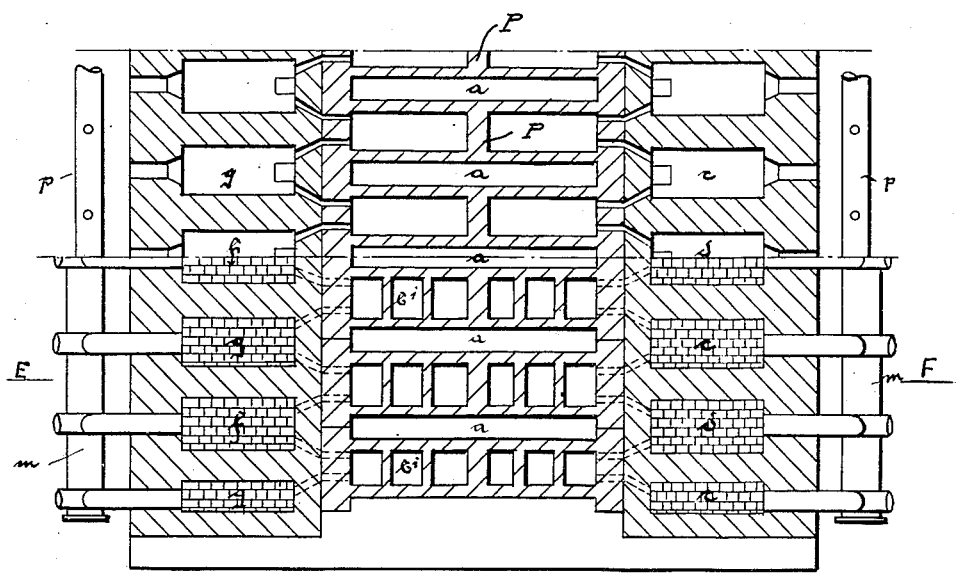
Fig. 2 shows several cross sections of the same, at different levels.

$a$ denotes the vertical chambers of the oven, which have arranged between them the heating walls subdivided so as to form halves $b$, $b^1$ by partitions P, each of which extends from the bottom of a wall upwardly. Each wall half is subdivided to form a plurality of continuous vertical combustion flues extending substantially throughout the height of the heating wall. Each of these halves $b$, $b^1$ is in communication at its floor or lower end with the appurtenant gas and air regenerators. The arrangement of these regenerators is so chosen that each pair of adjacent heating walls may be supplied from a gas regenerator and an air regenerator, see Fig. 2. The regenerators denoted by $c$ serve to preheat the air, whilst the gas is preheated in the regenerators $d$. The gas and air preheated in the regenerators $c$ and $d$, respectively, enter the heating wall halves $b$ at the floor end thereof and burn, after having united, upward in said wall half and are led to the other communicating wall halves $b^1$ through the bridge passage $e$ arranged above them. The wall halves $b^1$ are connected in pairs with the appurtenant regenerators $f$ and $g$, in the same way as the wall halves $b$ with the regenerators $c$ and $d$, see Fig. 2. With the described direction of the flow of the heating gases the regenerators $f$ and $g$ are preheated by the waste heat delivered from the wall halves $b^1$, said waste heat passing from these regenerators through conduits $h$ to the waste heat channel $i$, Fig. 1, leading to the chimney. As it will be seen from Fig. 1, each regenerator is in communication with the outer air by an opening covered by a flap $k$ and with the lean gas pipe $m$ by a valve $n$, and also with the waste heat channel $i$ by the pipes $h$, in which dampers $h^1$ are provided. The said throttling members $h^1$, $k$, $n$ are so adjusted that at one chamber side an air regenerator alternates with a gas regenerator and that all the regenerators of the other chamber side are set to waste heat. By reversing these throttling members the direction of flow of the heating gases is reversed in a known manner and the work done by the regenerators is exchanged accordingly.

In order to uniformly regulate the draught in the individual flues of the heating wall halves $b$, $b^1$, dampers $o$ are provided for in the usual way in the top end of said flues. Furthermore an arrangement is made to heat the oven by strong gas. To this end pipes $q$ are branched off from the strong gas main $p$, which lead to each heating wall half $b$, $b^1$. From them the strong gas is supplied to the individual heating flues by vertical distributing pipes $r$ passing through the floor of the oven and discharging into the wall halves at the lower ends of the flues. Instead of providing said branch pipes $q$, brick channels may be made use of passing over the floor of the oven and discharging in the same manner as the channels leading from the regenerators, into the wall halves $b$, $b^1$. A second strong gas main $s$ located above the oven and from which upper vertical distributing pipes $t$ lead to and discharging into the upper bridge passage $e$, serves for heating of the wall halves supplementarily with downwardly flowing gases.

The described heating arrangements enable the oven to be operated by pure lean gas or strong gas heating or by a selective or common strong and lean gas heating. In this latter case the valves $n$ are closed to such an extent, that the heating wall halves $b$ or $b^1$ are fed with a quantity of air considerably exceeding the fed quantity of lean gas, this excess of air serving to burn the strong gas entering the heating flues through the pipes $r$ and $t$. In this manner it is made possible in the most perfect way to supply, according to the quantity of heat radiated by the walls, so much heat to the individual heating walls, by suitably selecting the heating which is the best in the individual case, that all the chambers of the oven are heated uniformly and an absolutely uniform carbonizing period of all chambers is obtained thereby.

As it will be understood without any explanation, the mode of operation of this last-described oven is the same as in the first-described embodiment.

Claims:

1. In a vertical chamber oven provided with a series of alternate vertical oven chambers having narrow sides and heating walls therefor arranged side by side, each of said heating walls being provided with continuous, vertical combustion flues extending substantially throughout the height of the wall, a vertical partition in each of said walls extending transverse thereto from the bottom of the wall upwardly, subdividing each of said walls into communicating halves, a bridge passage above the flues of each of said walls communicably connecting the upper ends of the flues of the halves of the wall, a series of regenerators arranged along each of the two sides of the series, channels communicably connecting the lower end of each regenerator of one of the series of regenerators with the lower ends of the flues of one half of each of two of the adjacent heating walls, a waste gas channel located above each series of regenerators and means communicably connecting the regenerators of each of the series of regenerators with one of the waste gas channels.

2. In a vertical chamber oven provided with a series of alternate vertical oven chambers having narrow sides and heating walls therefor arranged side by side, each of said walls being provided with continuous, vertical combustion flues extending substantially throughout the height of the wall, regenerators arranged along each of the two sides of said series, a transverse partition in each wall of an oven chamber, said partition extending from the bottom of the wall upwardly and subdividing the walls of each chamber into halves, each containing a plurality of flues, a bridge passage above the flues of each of said walls communicably connecting the upper ends of the flues of the halves of the wall, and means for communicably connecting each regenerator with the lower ends of combustion flues of two of the heating walls.

3. In a vertical chamber oven provided with a series of alternate vertical oven chambers having narrow sides and heating walls therefor arranged side by side, each of said walls being provided with continuous vertical combustion flues extending substantially throughout the height of the wall, regenerators arranged along each of the two sides of said series, a transverse partition in each heating wall of an oven chamber, said partition extending from the bottom of the wall upwardly and subdividing the walls of each chamber into halves, each containing a plurality of flues, a bridge passage above the flues of each of said walls communicably connecting the upper ends of the flues of the halves of the wall, means for communicably connecting each regenerator with the lower ends of the flues of one half of two of the adjacent heating walls, and adjustable throttling members for each regenerator.

4. In a vertical chamber oven provided with a series of alternate vertical oven chambers having narrow sides and heating walls therefor arranged side by side, each of said walls being provided with continuous vertical combustion flues extending substantially throughout the height of the wall, regenerators arranged along each of the two sides of said series, a transverse partition in each of said heating walls extending from the bottom of the wall upwardly and subdividing the walls into halves, each containing a plurality of flues, a bridge passage above the flues of each of said walls communicably connecting the upper ends of the flues of the halves of the wall, means for communicably connecting each regenerator with the lower ends of the flues of one-half of two of the adjacent walls, and means for supplying unpreheated fuel gas directly to the flues of each of said heating wall halves.

5. In a vertical chamber oven provided with a series of alternate vertical oven chambers having narrow sides and heating walls therefor arranged side by side, each of said walls being provided with continuous vertical combustion flues extending substantially throughout the height of the wall, regenerators arranged along each of the two sides of said series, a transverse partition in each of said heating walls extending from the bottom of the wall upwardly and subdividing the walls of each oven chamber into communicating halves, each containing a plurality of flues, a bridge passage above the flues of each of said walls communicably connecting the upper ends of the flues of the halves of the wall, means for communicably connecting each regenerator with the lower ends of the flues of one half of two adjacent walls, adjustable throttling members for each regenerator and means for supplying unpreheated fuel gas directly to each of said wall halves, said means being adapted to discharge into the individual heating flues of said wall halves at the lower end of said flues.

6. In a vertical chamber oven provided with a series of alternate vertical oven chambers having narrow sides and heating walls therefor arranged side by side, each of said walls being provided with continuous vertical combustion flues extending substantially throughout the height of the wall, regenerators arranged along each of the two sides of said series a transverse partition in each of said heating walls extending from the bottom of the wall upwardly and subdividing the walls into halves each containing a plurality of flues, a bridge passage above the flues of each wall communicably connecting the upper ends of the flues of the halves of the wall, means for communicably connecting each regenerator with the lower ends of the flues of one half of two adjacent walls, means for supplying unpreheated fuel gas to each of said wall halves, said means being adapted to discharge into the individual heating flues at the lower ends of the flues and supplemental means for supplying unpreheated fuel gas, said supplemental means being adapted to discharge into the bridge passage above the flues.

In testimony whereof, I have signed my name to this specification.

CARL OTTO.